US010828610B2

(12) United States Patent
Liu et al.

(10) Patent No.: US 10,828,610 B2
(45) Date of Patent: Nov. 10, 2020

(54) MIXING ASSEMBLY

(71) Applicant: FORUM US, INC., Houston, TX (US)

(72) Inventors: Yi Liu, Houston, TX (US); Gregory N. Gilbert, Sugar Land, TX (US); Jonathan Carter Boul, Hockley, TX (US); Merlin Thomas Collins, Jr., Dayton, TX (US)

(73) Assignee: FORUM US, INC., Houston, TX (US)

( * ) Notice: Subject to any disclaimer, the term of this patent is extended or adjusted under 35 U.S.C. 154(b) by 241 days.

(21) Appl. No.: 16/011,161

(22) Filed: Jun. 18, 2018

(65) Prior Publication Data

US 2019/0134576 A1 May 9, 2019

Related U.S. Application Data

(60) Provisional application No. 62/527,226, filed on Jun. 30, 2017.

(51) Int. Cl.
*B01F 5/06* (2006.01)
*B01F 5/04* (2006.01)
*B01F 3/08* (2006.01)
*F16K 5/06* (2006.01)
*F16K 47/04* (2006.01)

(52) U.S. Cl.
CPC .......... *B01F 5/069* (2013.01); *B01F 3/0861* (2013.01); *B01F 3/0865* (2013.01); *B01F 5/0451* (2013.01); *B01F 5/0463* (2013.01); *F16K 5/0605* (2013.01); *F16K 47/045* (2013.01); *B01F 2215/0081* (2013.01)

(58) Field of Classification Search
CPC .......... B01F 2215/0081; B01F 3/0861; B01F 3/0865; B01F 5/0451; B01F 5/0463; B01F 5/069; F16K 47/045; F16K 5/0605

USPC .......... 366/172.2, 174.1, 175.1, 175.2
See application file for complete search history.

(56) References Cited

U.S. PATENT DOCUMENTS

| 3,734,111 A | * | 5/1973 | McClintock | .......... B01F 5/0451 |
| | | | | 137/3 |
| 3,880,191 A | * | 4/1975 | Baumann | .............. F16K 47/045 |
| | | | | 137/625.32 |
| 4,068,830 A | * | 1/1978 | Gray | .................... B01F 5/0451 |
| | | | | 366/175.2 |
| 4,114,195 A | * | 9/1978 | Dirksing | ............. A47L 15/4427 |
| | | | | 134/199 |

(Continued)

FOREIGN PATENT DOCUMENTS

GB 2383276 A 6/2003

OTHER PUBLICATIONS

PCT International Search Report/Written Opinion dated Oct. 22, 2018 for Application No. PCT/US2018/039425.

(Continued)

*Primary Examiner* — Tony G Soohoo
(74) *Attorney, Agent, or Firm* — Patterson & Sheridan, L.L.P.

(57) ABSTRACT

A mixing assembly comprises a tubular member and a spherical body disposed within a portion of the tubular member. The spherical body has a central volume, and a wall defined by an outside diameter and an inside diameter. The spherical body includes an inlet side and an outlet side, and a plurality of channels formed in each of inlet side and outlet side. The channels are oriented toward a center of the central volume.

20 Claims, 11 Drawing Sheets

(56) References Cited

U.S. PATENT DOCUMENTS

| | | | | |
|---|---|---|---|---|
| 4,212,321 A * | 7/1980 | Hulsey | F16K 5/0605 137/625.32 |
| 4,441,823 A * | 4/1984 | Power | B01F 3/0807 138/42 |
| 4,479,510 A * | 10/1984 | Bey | F16K 5/10 137/625.31 |
| 4,530,375 A * | 7/1985 | Bey | F16K 5/10 137/625.32 |
| 4,573,803 A * | 3/1986 | Gritters | B01F 5/045 137/890 |
| 4,610,273 A * | 9/1986 | Bey | F16K 5/10 137/625.32 |
| 4,774,984 A * | 10/1988 | Peters | F16K 47/045 137/625.32 |
| 5,180,139 A * | 1/1993 | Gethmann | F16K 5/0605 137/625.32 |
| 5,482,249 A * | 1/1996 | Schafbuch | F16K 47/08 251/118 |
| 5,597,236 A * | 1/1997 | Fasano | B01F 5/0451 366/181.5 |
| 5,680,889 A * | 10/1997 | Boger | F16K 5/12 137/625.32 |
| 5,771,929 A * | 6/1998 | Boger | F16K 5/0605 137/625.32 |
| 6,869,213 B2 * | 3/2005 | Cappellino | B01F 5/0451 366/171.1 |
| 7,011,109 B2 * | 3/2006 | Tran | F16K 5/0605 137/625.32 |
| 7,234,488 B2 * | 6/2007 | Partridge | F16K 5/0605 137/625.32 |
| 7,278,448 B2 * | 10/2007 | Christenson | F16K 5/0605 137/614.17 |
| 8,141,843 B2 * | 3/2012 | Rimboym | F16K 5/0605 251/127 |
| 8,366,070 B2 * | 2/2013 | Rimboym | F16K 5/0605 137/625.31 |
| 9,404,591 B2 * | 8/2016 | Yli-Koski | F16L 25/065 |
| 10,100,947 B2 * | 10/2018 | Gattavari | F16K 47/045 |
| 2012/0228233 A1 * | 9/2012 | Terashima | B01F 3/1228 210/738 |
| 2014/0238941 A1 | 8/2014 | Haydock | |

OTHER PUBLICATIONS

Examination Report dated Feb. 20, 2020 for Application No. GC 2018-35548.

Office Action Communication pursuant to Rules 161(1) and 162 EPC dated Feb. 7, 2020 for Application No. 18743160.6.

* cited by examiner

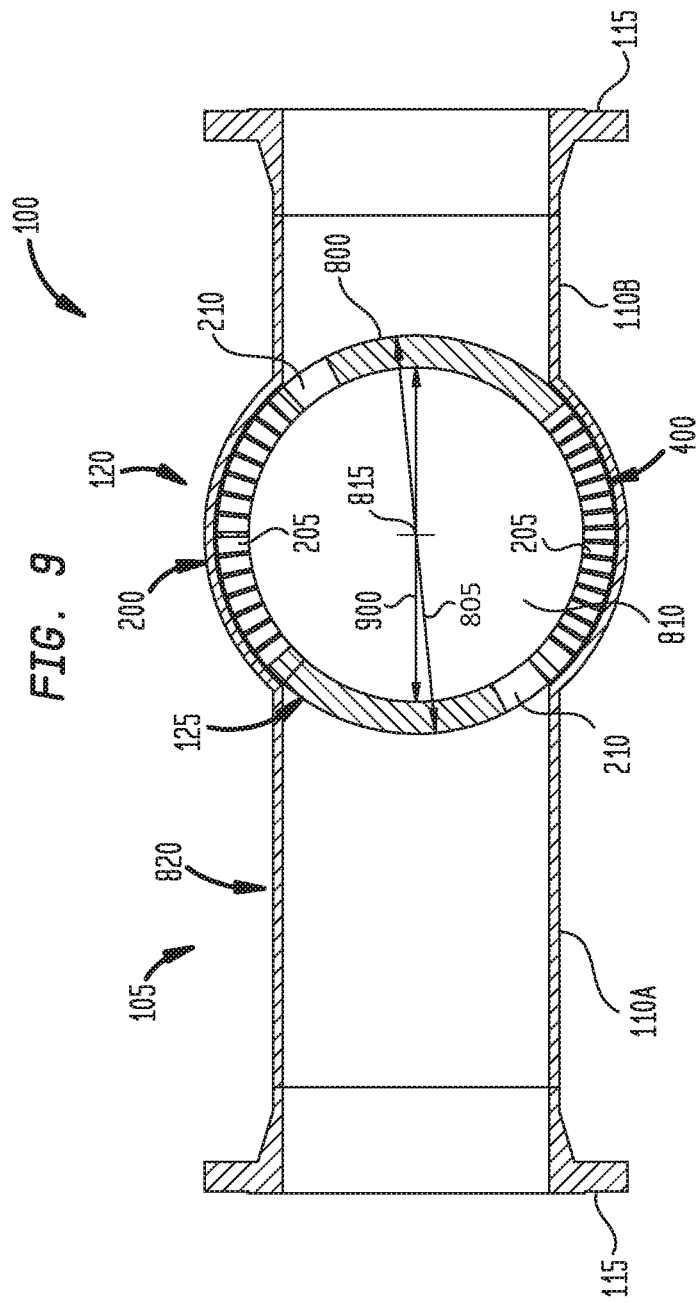

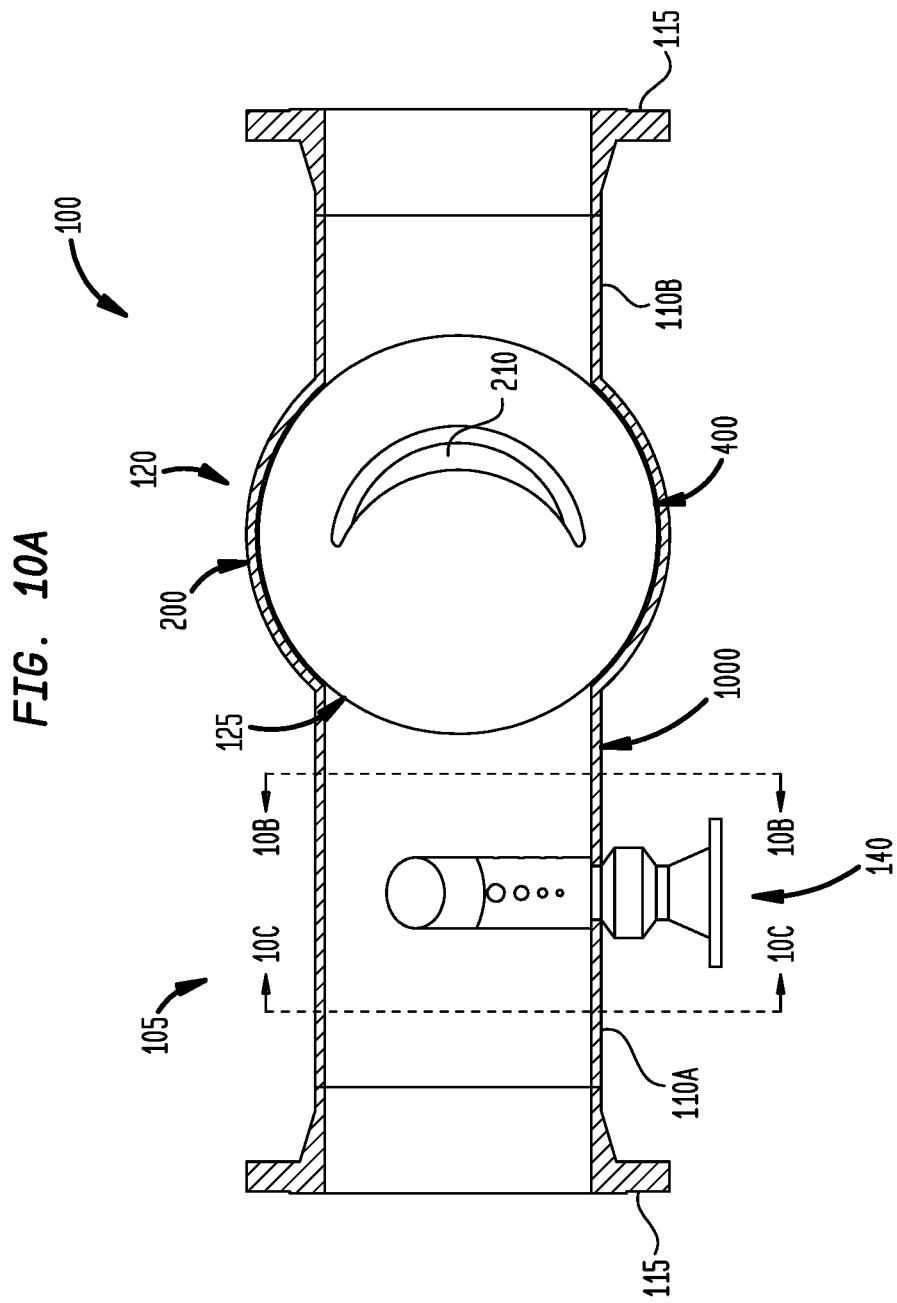

MIXING ASSEMBLY

BACKGROUND

Field

Embodiments of the disclosure generally relate to a mixing assembly for mixing fluids, such as for use in the oil and gas industry.

Description of the Related Art

Salts (such as sodium chloride, calcium chloride, magnesium chloride, etc.) in crude oil can cause corrosion issues in piping and machinery used in oil refining processes. Therefore, desalting of crude oil is one of the initial steps performed during an oil refining process. A desalter system is used to remove salts and other water soluble impurities contained within crude oil. To remove the residual water from the crude oil, fresh water is mixed with the crude oil to create a water-oil mixture, also referred to herein as a water-oil emulsion.

A mixer, positioned upstream of the desalter system, is utilized to create the water-oil emulsion by mixing water (and other chemicals to aid in mixing) with the crude oil. Conventional mixers however have uneven shear force exerted to the process flow, leading to either dead-spots and/or other areas having minimal turbulent flow, which reduce the mixing efficiency of the mixer, or extreme local turbulence, which promote highly inseparable emulsion. Other drawbacks of conventional mixers include one or more of a high pressure drop, a high power consumption, an increased chemical/water consumption, a large footprint, limited installation orientations, etc.

Therefore, there is a need for new and improved methods and apparatus for efficient mixing of water and crude oil.

SUMMARY

In one embodiment, a mixing assembly is provided that includes a tubular member and a spherical body disposed within a portion of the tubular member. The spherical body has a central volume, and a wall defined by an outside diameter and an inside diameter. The spherical body includes an inlet side and an outlet side, and a plurality of channels formed in each of inlet side and outlet side. The channels are oriented toward a center of the central volume.

In one embodiment, a mixing assembly is provided that includes a tubular member, and a spherical body disposed within a portion of the tubular member. The spherical body has an outside diameter and an inside diameter defining a central volume, and a plurality of channels formed in an inlet side and an outlet side of the spherical body. The spherical body includes a pair of flush windows formed in an area of the spherical body not occupied with the plurality of channels.

In one embodiment, a mixing assembly is provided that includes a tubular member and a spherical body disposed within a portion of the tubular member. The spherical body has an outside diameter and an inside diameter defining a central volume, an inlet side and an outlet side, a plurality of channels formed in each of the inlet side and outlet side, and a Y-shaped injection nozzle coupled to the tubular member

BRIEF DESCRIPTION OF THE DRAWINGS

So that the manner in which the above recited features of the embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope, for the embodiments may admit to other equally effective embodiments.

FIG. 9 is a sectional view of the mixing assembly along lines 9-9 of FIG. 5.

FIG. 10A is a sectional view of the mixing assembly showing one embodiment of an injection nozzle.

Figure 1:
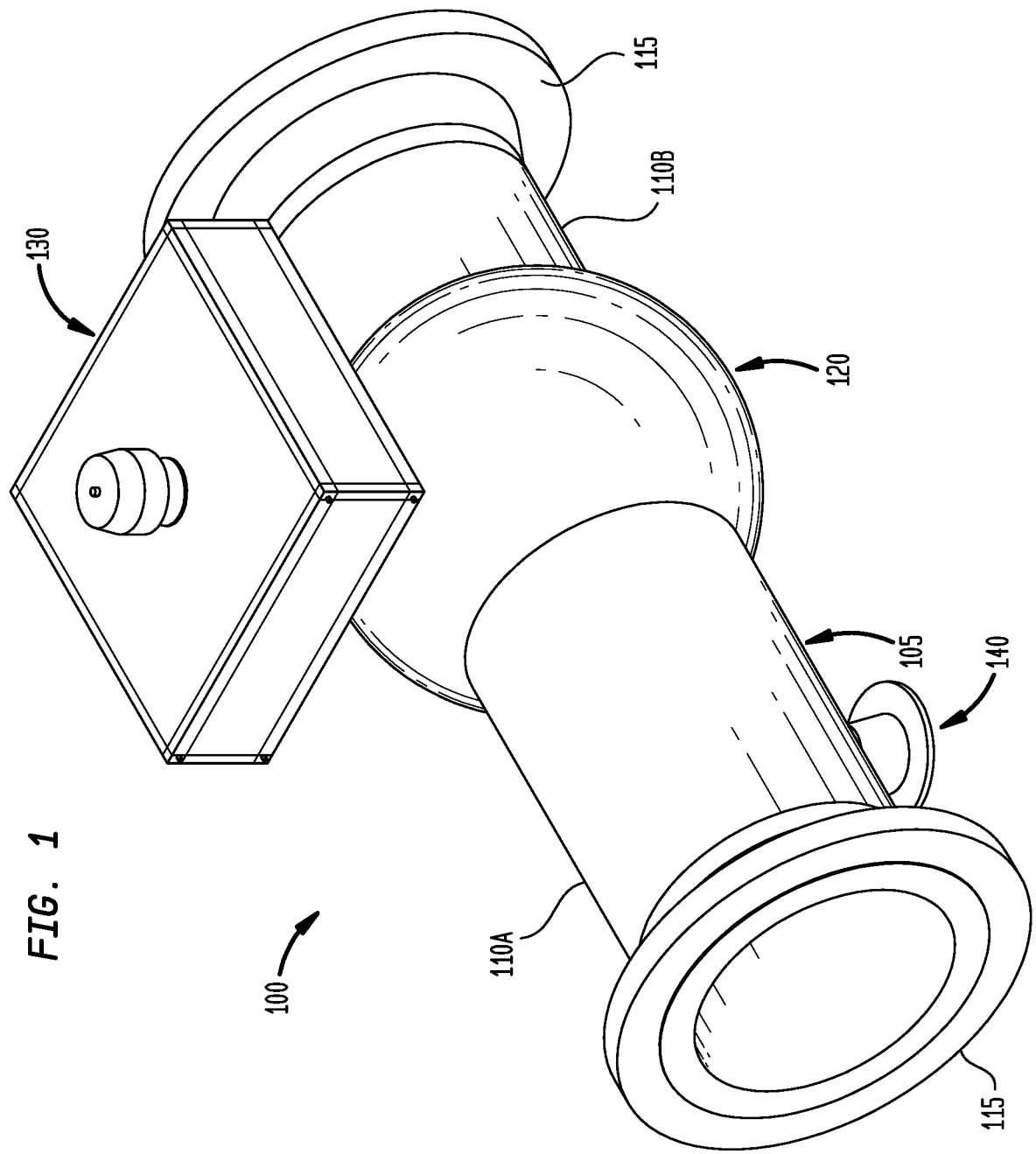
FIG. 1 illustrates an isometric view of a mixing assembly, according to one embodiment disclosed herein.
Figure 2:
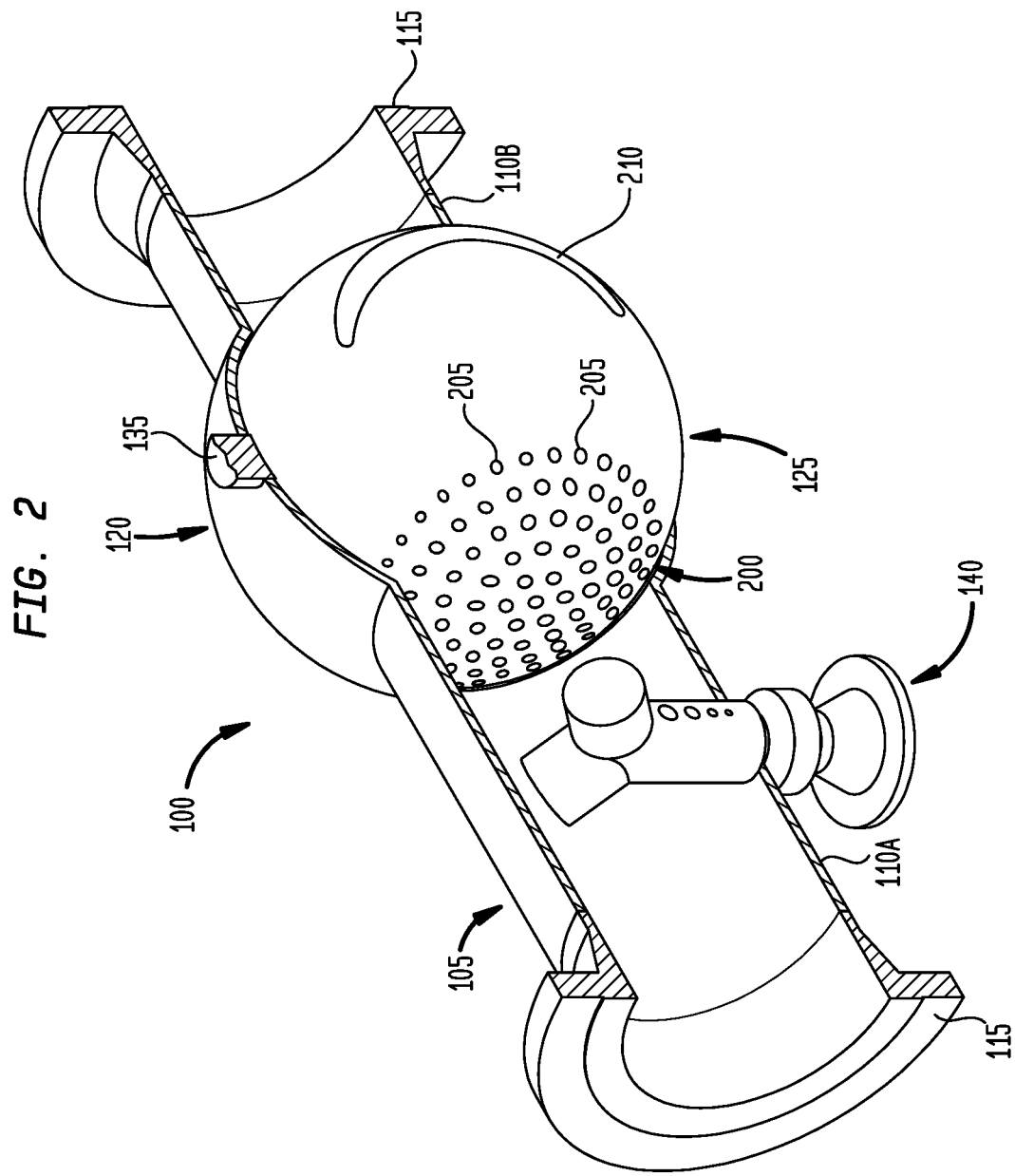
FIG. 2 is an isometric partial cross-sectional view of the mixing assembly.
Figure 3:
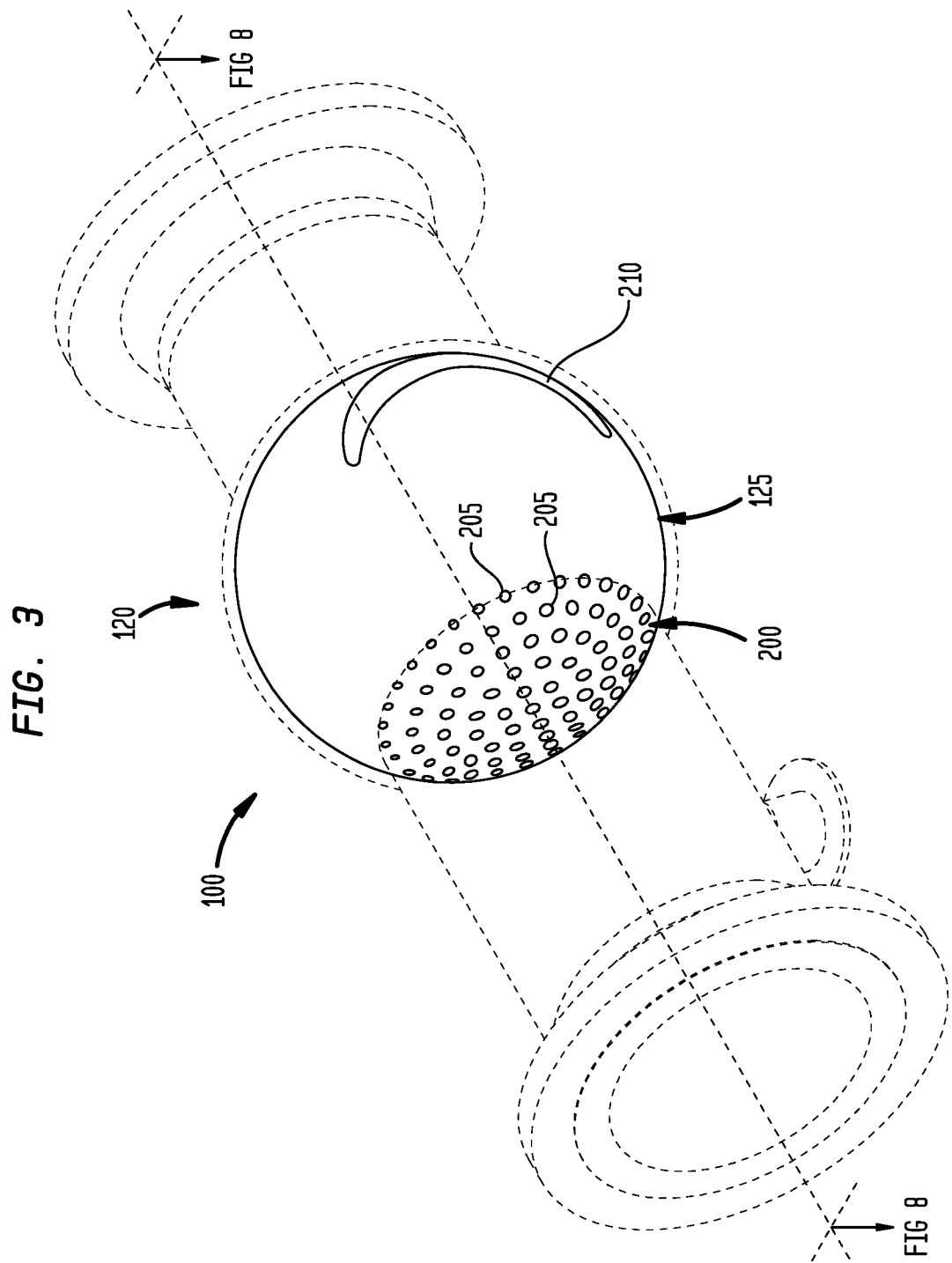
FIG. 3 illustrates an isometric view of the mixing assembly with certain external components shown in phantom to show a spherical body of the mixing assembly.

It is contemplated that elements disclosed in one embodiment may be beneficially utilized on other embodiments without specific recitation.

DETAILED DESCRIPTION

FIGS. 1-9 are various views illustrating one embodiment of a mixing assembly 100. The mixing assembly 100 may be located upstream of a desalter system that is configured to remove various contaminants from crude oil during an oil treatment and refining process. The contaminants may include various salts, the salts including sodium chloride, calcium chloride, magnesium chloride, etc. If not removed from the crude oil, these contaminants can cause corrosion or other damage to the piping and machinery downstream from the desalter system used in the oil refining process.

Referring to FIGS. 1-5, the mixing assembly 100 includes a tubular member 105. The tubular member 105 includes an inlet end 110A and an outlet end 110B. A flange 115 is coupled to opposing sides of the tubular member 105 to facilitate coupling to a flow line upstream of a desalter system.

A mixing section 120 is provided within the tubular member 105 between the flanges 115. The mixing section 120 houses a spherical body 125 (shown in FIGS. 2-5). An actuator 130 is coupled to the spherical body 125 by a shaft 135 (shown in FIG. 2). The actuator 130 is utilized to rotate the spherical body 125 within the mixing section 120. The actuator 130 may be pneumatic, electrical, mechanical, hydraulic, manual, or a combination thereof. The actuator 130 may provide 180 degree rotation of the spherical body 125.

One or more injection nozzles 140 (only one is shown) may be coupled to the inlet end 110A of the tubular member 105. The inlet end 110A of the tubular member 105 is used to contain and flow crude oil to the spherical body 125. The injection nozzle 140 is utilized to inject one or a combination of water and chemicals into the crude oil in the inlet end 110A of the tubular member 105. In one embodiment, water and different chemicals may not be combined and injected together. Thus, multiple injection nozzles may be utilized if more than one injection flow is required. The outlet end 110B of the tubular member 105 is used to contain and flow mixture of the crude oil and the one or both of water and chemicals that have been mixed by the spherical body 125 as further described below.

In one embodiment, the mixing assembly 100 is a modulated multiphase mixer. In oil production systems, gas is also a part of process flow. Thus, the mixing assembly 100 is not limited to utilization for oil and water mixing, but also oil, water, and gas mixing. In addition, the mixing assembly 100 is not limited to oil desalting systems and may be utilized in other industries. The mixing assembly 100 can be applied to any industry with the objective of obtaining homogeneity of a mixture flow, and/or increasing the contact surface in process like absorption, extraction, dispersion, and/or drying.

Figure 4:
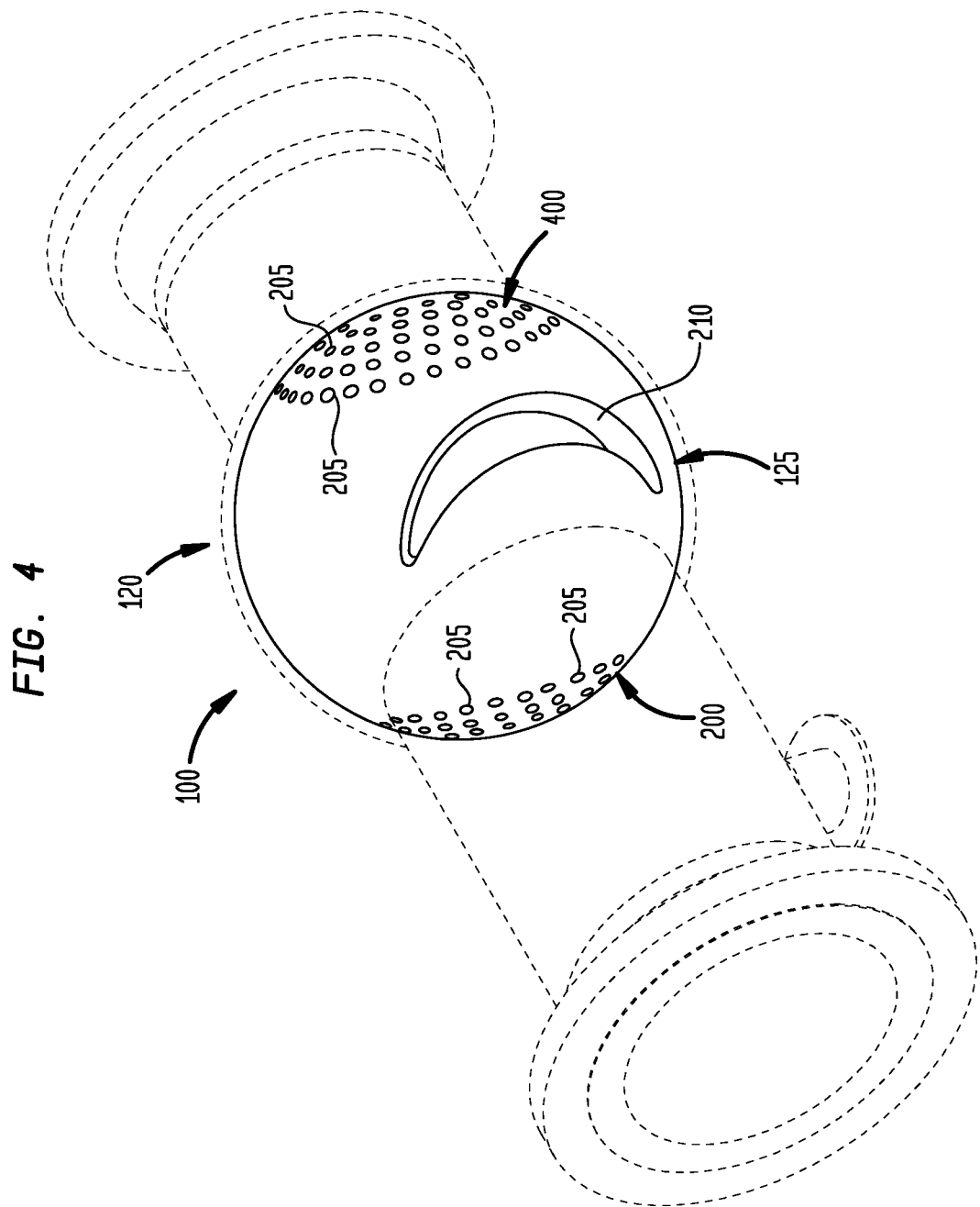
FIG. 4 illustrates an isometric view of the mixing assembly with certain external components shown in phantom and with the spherical body rotated from the view shown in FIG. 3.
Figure 5:
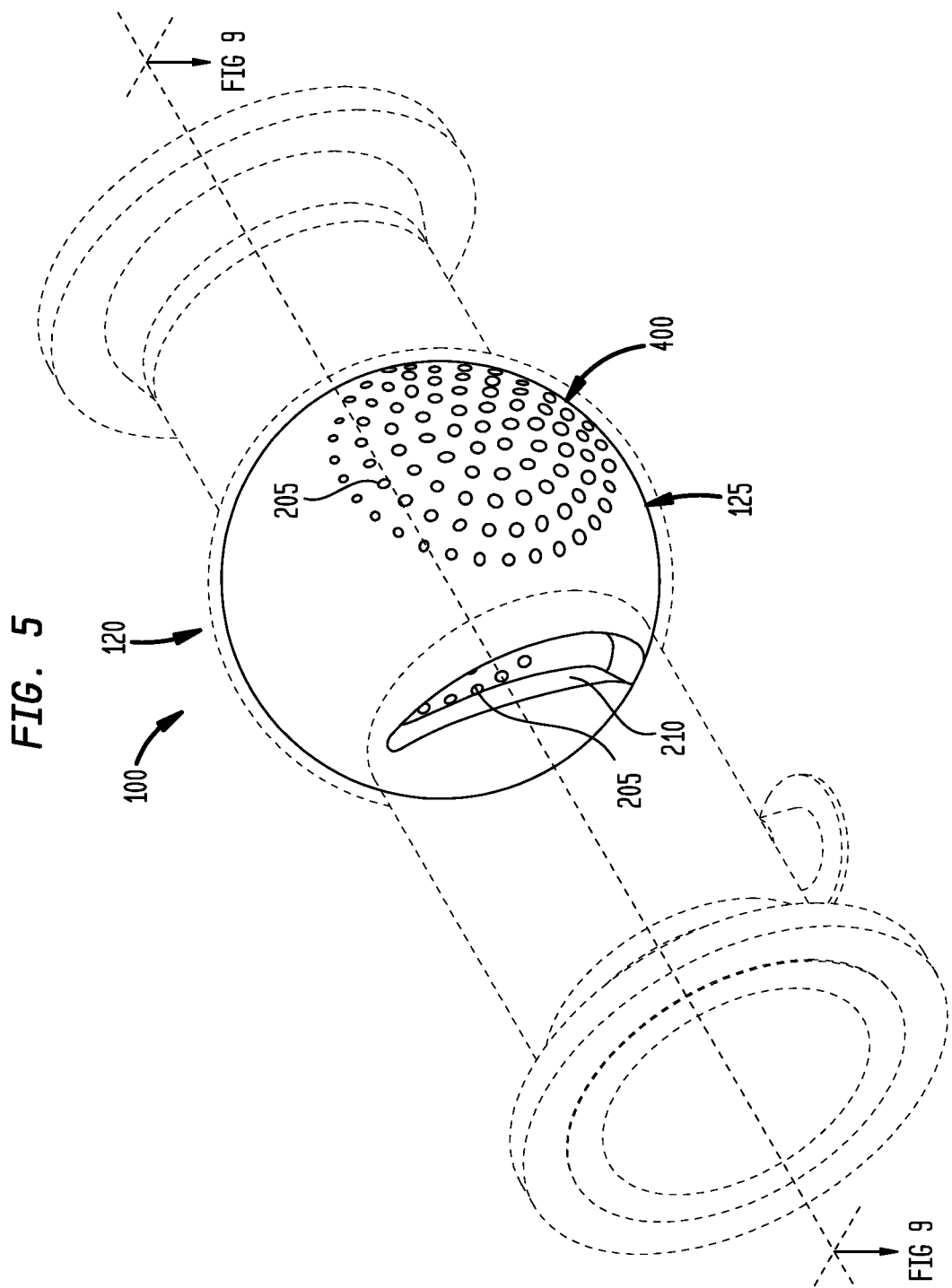
FIG. 5 illustrates an isometric view of the mixing assembly with certain external components shown in phantom and with the spherical body rotated from the view shown in FIG. 4.
Figure 6:
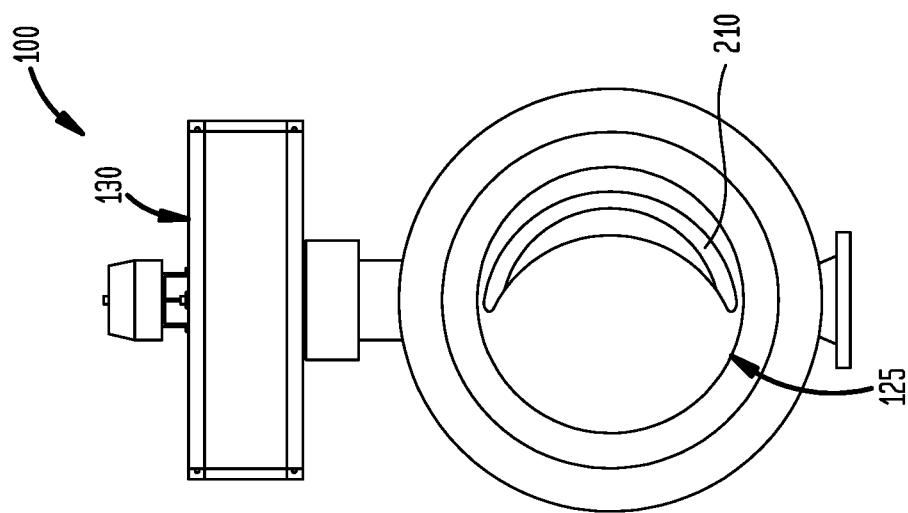
FIGS. 6 and 7 are end views of the mixing assembly with the spherical body rotated in different positions.
Figure 7:
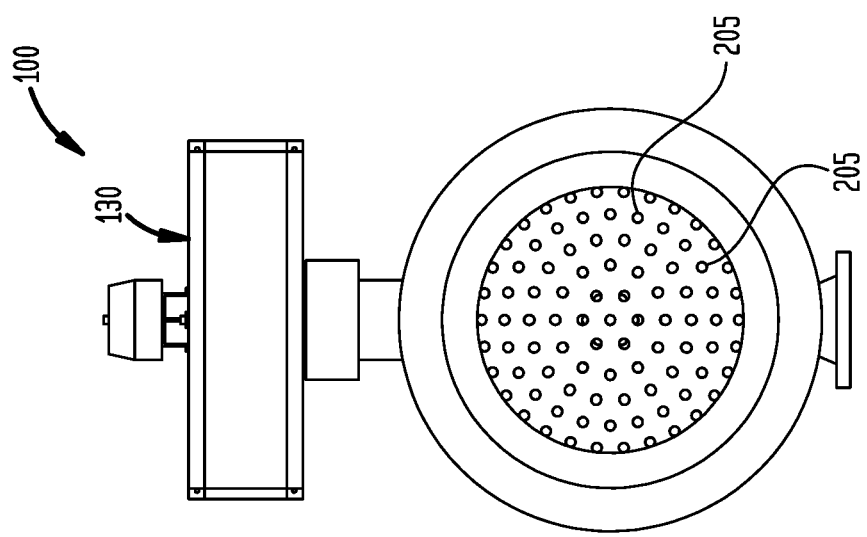

Referring to FIGS. 2-9, the spherical body 125 includes an inlet side 200 and an outlet side 400 (shown in FIG. 4). The inlet side 200 is positioned in an opposing relationship (e.g., 180 degrees) from the outlet side 400. Both of the inlet side 200 and the outlet side 400 include a plurality of channels 205. In one embodiment, each of the plurality of channels 205 may be the same size (e.g., diameter and/or length). However, the size of the channel 205 and/or arrangement may be different between the inlet side 200 and the outlet side 400. In one embodiment, the channels 205 on the inlet side 200 may be smaller than the channels 205 on the outlet side 400. In this embodiment, the channels 205 on the outlet side 400 are used to create a certain pressure drop to prevent flow short cut within the spherical body 125.

Figure 8:
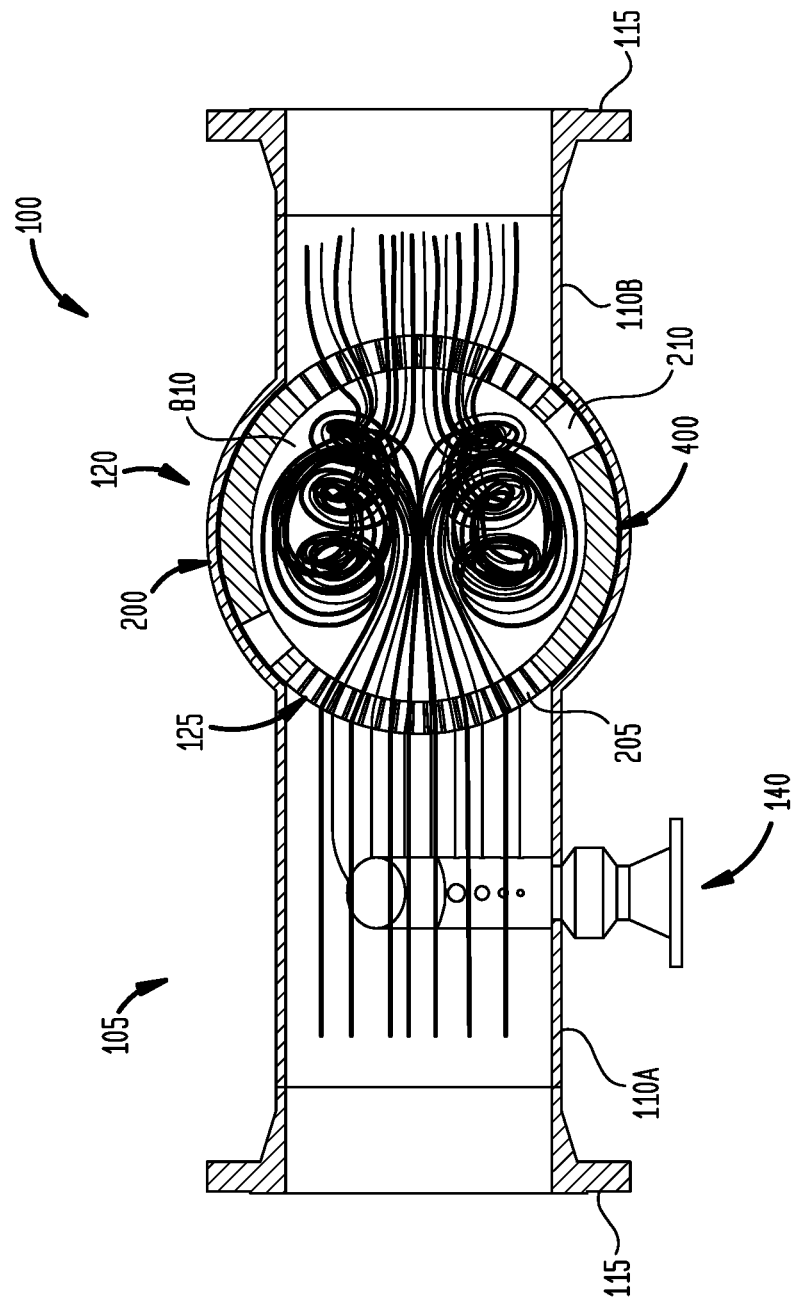
FIG. 8 is a sectional view of the mixing assembly along lines 8-8 of FIG. 3.

Referring to FIGS. 8 and 9, the spherical body 125 includes a central volume 810, and a wall 800 defined between an outside diameter 805 and an inside diameter 900 (shown in FIG. 9). In one embodiment, the inside diameter 900 of the central volume 810 is greater than an inside diameter of the tubular member 105.

The plurality of channels 205 are formed through a portion of the wall 800 to provide fluid communication with the central volume 810 of the spherical body 125. The central volume 810 of the spherical body 125 includes a geometric center 815. In one embodiment, each of the plurality of channels 205 in the inlet side 200 and the outlet side 400 are oriented toward the geometric center 815 of the central volume 810 to create flow paths for the crude oil and water (and other chemicals) from the inlet end 110A through the central volume 810 and to the outlet end 110B of the tubular member 105 having a homogenous shear force to efficiently mix the crude oil and water (and other chemicals).

The spherical body 125 may be rotated into a position such that the oil/water/chemical solution from the inlet end 110A flows through all of the plurality of channels 205. The spherical body 125 also may be rotated such that the oil/water/chemical solution from the inlet end 110A flows through a portion of the plurality of channels 205. The position of the spherical body 125 and/or the plurality of channels 205 may be static during mixing but the spherical body 125 may be rotated at times depending on the oil/water/chemical solution that is flowing into the mixing assembly 100. For example, the spherical body 125 may be rotated to open or close flow through the plurality of channels 205 to accommodate process flow fluctuations, control pressure drop, regulate the degree of mixing, or combinations thereof.

An example of the flow paths formed within the central volume 810 is shown in FIG. 8. The construction of the spherical body 125 generates a moderate yet efficient turbulent flow condition that facilitates a mixing of oil/water with low pressure drop and low power consumption. As shown, stagnant areas and/or extreme eddy currents due to uneven shear force, which are prevalent in conventional mixing devices, are minimized or eliminated with the use of the spherical body 125 as described herein.

The mixing assembly 100 as disclosed herein is different from the conventional mixing devices (static mixers or other mixing valves) which have a high pressure drop across the device as well as a non-homogenous shear force. Nonhomogeneous shear force exerted by conventional mixing technologies to the process flow is the main reason for one or a combination of a high pressure drop, a low mixing efficiency and a high probability of creation of an inseparable emulsion. The high pressure drop and the non-homogenous shear force serves to generate undesired stable emulsions. However, the mixing assembly 100 as disclosed herein utilizes the main process flow momentum to create turbulent eddies in the central volume 810 of the spherical body 125 that efficiently enhances the mixing process, creates uniform sized droplets, and lowers power consumption.

Solid accumulations, mostly from solids suspended or precipitated in/from the process flow, tend to accumulate in the spherical body 125. However, the spherical body 125 includes a pair of flush windows 210 in order to eliminate any solid accumulations. The pair of flush windows are formed in an area of the spherical body 125 not occupied with the plurality of channels 205. Each of the flush windows 210 may be positioned in the wall 800 of the spherical body 125 in an opposing relationship (e.g., 180 degrees) from the other. Each of the flush windows 210 may be arc-shaped. The flush windows 210 are utilized to flush solids that may have collected within the central volume 810 of the spherical body 125 by rotating the spherical body 125 into the position shown in FIG. 9.

FIG. 10A is a sectional view of a portion of the mixing assembly 100 showing one embodiment of an injection nozzle 140. The injection nozzle 140 is positioned in the inlet end 110A of the tubular member 105 from a lower side 1000 thereof. Although shown as a Y-shaped injection nozzle 140 that extends into the tubular member 105, the mixing assembly 100 may include different shaped nozzles that extend into the tubular member 105, nozzles that do not extend into the tubular member 105, and/or injection ports formed in the wall of the tubular member 105, all configured to inject fluids into the mixing assembly 100.

Figure 10C:
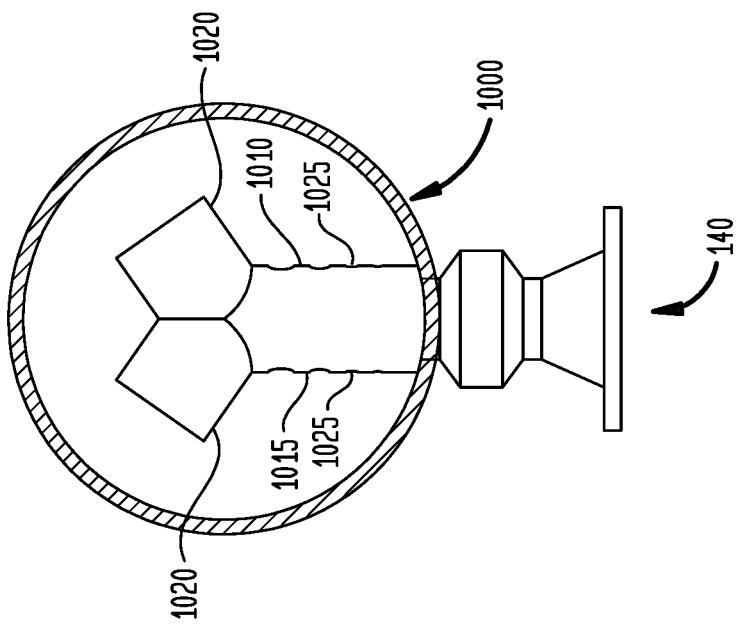
FIGS. 10B and 10C are side views of the injection nozzle along lines 10B-10B and 10C-10C of FIG. 10A.
Figure 10B:
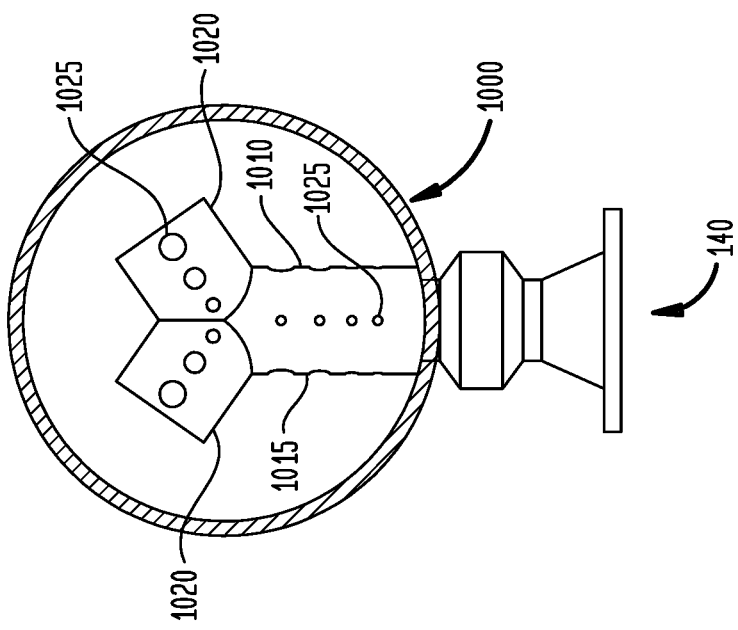

FIGS. 10B and 10C are side views of the injection nozzle 140 along lines 10B-10B and 10C-10C of FIG. 10A. The plurality of channels 205 in the spherical body 125 are not shown in FIG. 10A or 10C for clarity. The injection nozzle 140 according to this embodiment includes a Y-shaped body 1010 consisting of one or more tubular members, such as a trunk tubular member 1015 and a pair of branch tubular members 1020 coupled to the trunk tubular member 1015 to form the Y-shape. In one embodiment, the injection nozzle 140 may comprise only the trunk tubular member 1015 such that the injection nozzle 140 is in the form of a cylindrical tube. One or a combination of the trunk tubular member 1015 and the branch tubular members 1020 include openings 1025. The openings 1025 may have a diameter that varies along a length of the trunk tubular member 1015 and/or the branch tubular members 1020. The openings 1025 may be formed along the sides of the trunk tubular member 1015 and/or the branch tubular members 1020 and arranged to inject fluids in a direction that is parallel (e.g., co-flow and/or counter-flow), perpendicular, and/or at an angle relative to the main process flow. The changes of the size of each opening 1025 can facilitate even distribution of the injection flow through the cross section of the main process flow.

Figure 11:
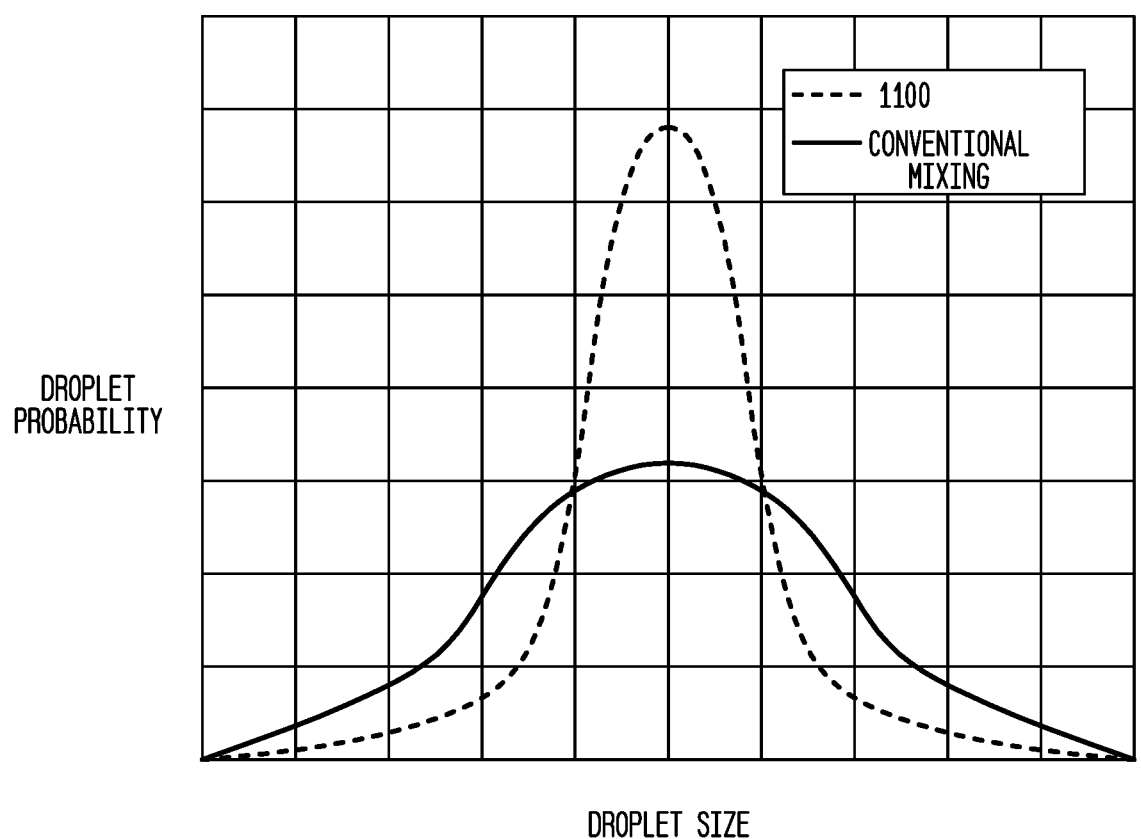
FIG. 11 is a graph showing droplet size vs droplet probability comparing the mixing assembly as described herein with a conventional mixing device.

FIG. 11 is a graph showing droplet size vs droplet probability comparing the mixing assembly 100 as described herein with a conventional mixing device. A curve 1100 shows the droplet size/probability provided by the mixing assembly 100 as disclosed herein while the solid curve shows the droplet size/probability of a conventional mixing device. The curve 1100 represents the mixing assembly 100 as disclosed herein and shows a lower percentage of non-uniform droplets (e.g., a combination of big and small droplets) resulting in more uniform/homogenous droplet sizes, which promotes mixing efficiency and/or contact rates. The conventional mixing device shows a higher percentage of non-uniform droplets which may negatively affect mixing efficiency.

The mixing assembly 100 as described herein includes the following benefits. The mixing assembly 100 has the capability to adjust the degree of mixing by rotation of the spherical body 125, and includes a high mixing efficiency throughout the entire operational range (e.g., a high turn-down ratio). The mixing assembly 100 as disclosed herein may be utilized for high efficiency multiphase mixing (e.g., oil, gas, and water) as well as mixing other liquids and gases. The mixing assembly 100 as disclosed herein provides low stable emulsion formation as well as a highly efficient separation for multiphase mixing.

The mixing assembly 100 as disclosed herein provides a reduced pressure drop (e.g., about 2 to 5 psi), which results in less costly operation due to lower energy consumption. The mixing assembly 100 as disclosed herein reduces or eliminates dead and/or extreme mixing spaces as compared to the conventional mixing devices. The mixing assembly 100 as disclosed herein reduces chemical/water consumption by about 20% to about 60%.

The mixing assembly 100 as disclosed herein may be operated and installed in any orientation upstream of a desalter system. For example, many conventional mixing devices are only operable in a horizontal orientation while the mixing assembly 100 as disclosed herein may be positioned to operate horizontally, vertically, or any position therebetween. The mixing assembly 100 as disclosed herein is more compact as compared to the other available mixing devices. The mixing assembly 100 as disclosed herein has a reduced installation cost as well as a high return on investment. The mixing assembly 100 as disclosed herein requires lower maintenance and is a flanged unit, which eases installation.

While the foregoing is directed to several embodiments, other and further embodiments may be devised without departing from the basic scope thereof, and the scope thereof is determined by the claims that follow.

The invention claimed is:
1. A mixing assembly, comprising:
a tubular member; and
a spherical body disposed within a portion of the tubular member, the spherical body having:
an outer surface that includes an outside diameter,
an inner surface that includes an inside diameter defining a spherical central volume, and a wall between the inner surface and the outer surface, wherein the spherical body includes an inlet side and an outlet side,
a plurality of channels formed through the wall and extending between the inner surface and the outer surface in each of the inlet side and the outlet side, wherein each of the plurality of channels are disposed outwardly of the spherical central volume and oriented toward a geometric center of the spherical central volume; and
a pair of arc-shaped flush windows formed in areas of the spherical body not occupied with the plurality of channels.

2. The mixing assembly of claim 1, wherein the inside diameter of the spherical body is greater than an inside diameter of the tubular member.

3. The mixing assembly of claim 1, wherein the arc-shaped flush windows are 180 degrees apart.

4. The mixing assembly of claim 1, further comprising an injection nozzle coupled to the tubular member.

5. The mixing assembly of claim 4, wherein the injection nozzle is in the form of a Y-shaped body or a cylindrical tube.

6. The mixing assembly of claim 1, wherein each of the plurality of channels in the inlet side are smaller than each of the plurality of channels in the outlet side.

7. The mixing assembly of claim 1, wherein the inlet side is 180 degrees from the outlet side.

8. The mixing assembly of claim 1, wherein the mixing assembly is located upstream of a desalter system.

9. A mixing assembly, comprising:
a tubular member comprising an upstream flow opening and a downstream flow opening; and
a spherical body disposed within a portion of the tubular member and between the upstream flow opening and the downstream flow opening, the spherical body having
an outer surface that includes an outside diameter,
an inner surface that includes an inside diameter defining a spherical central volume,
a wall between the inner surface and the outer surface,
a plurality of channels formed through the wall and extending between the inner surface and the outer surface in an inlet side and an outlet side of the spherical body, and
a pair of flush windows formed in areas of the spherical body not occupied with the plurality of channels, wherein the spherical body is rotatable between a first position and a second position, wherein in the first position the plurality of channels formed in the inlet side and the outlet side are positioned between the respective upstream and downstream flow paths of the tubular member and the spherical central volume, and in the first position the pair of flush windows are positioned between one or more sidewalls of the tubular member and the spherical central volume, wherein in the second position the pair of flush windows are positioned between the respective upstream and downstream flow paths of the tubular member and the spherical central volume, and in the second position the plurality of channels formed in the inlet side and the outlet side are positioned between one or more walls of the tubular member and the spherical central volume.

10. The mixing assembly of claim 9, wherein each of the plurality of channels are oriented toward a geometric center of the spherical central volume.

11. The mixing assembly of claim 9, wherein the inside diameter of the spherical body is greater than an inside diameter of the tubular member.

12. The mixing assembly of claim 9, wherein the flush windows are 180 degrees apart.

13. The mixing assembly of claim 9, wherein each of the flush windows are arc-shaped.

14. The mixing assembly of claim 13, further comprising an injection nozzle coupled to the tubular member.

15. The mixing assembly of claim 9, wherein each of the plurality of channels in the inlet side are smaller than each of the plurality of channels in the outlet side.

16. A mixing assembly, comprising:
a tubular member comprising an upstream flow opening and a downstream flow opening;
a spherical body disposed within a portion of the tubular member and between the upstream flow opening and the downstream flow opening, the spherical body having:
an outer surface that includes an outside diameter,
an inner surface that includes an inside diameter defining a spherical central volume, and a wall between the inner surface and the outer surface,
an inlet side and an outlet side, and
a plurality of channels formed through the wall and extending between the inner surface and the outer surface in each of the inlet side and outlet side, wherein each of the plurality of channels are disposed outwardly of the spherical central volume and oriented toward a geometric center of the spherical central volume; and
an injection nozzle coupled to the tubular member and extending at least partially into the upstream flow opening of the tubular member.

17. The mixing assembly of claim 16, wherein each of the plurality of channels are oriented toward a geometric center of the spherical central volume, and wherein the inside diameter of the spherical body is greater than an inside diameter of the tubular member.

18. The mixing assembly of claim 16, wherein the inlet side is 180 degrees from the outlet side.

19. The mixing assembly of claim 16, wherein the spherical body includes a pair of flush windows formed in areas of the spherical body not occupied with the plurality of channels.

20. The mixing assembly of claim 16, wherein the injection nozzle is in the form of a Y-shaped body or a cylindrical tube.

* * * * *